(12) United States Patent
Lee et al.

(10) Patent No.: US 8,122,334 B2
(45) Date of Patent: Feb. 21, 2012

(54) PARITY ERROR DETECTING CIRCUIT AND METHOD

(75) Inventors: Young-Hun Lee, Jeonju-si (KR);
Jae-Youl Lee, Yongin-si (KR);
Jong-Seon Kim, Seongnam-si (KR);
Kyung-Suc Nah, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1242 days.

(21) Appl. No.: 11/829,583

(22) Filed: Jul. 27, 2007

(65) Prior Publication Data
US 2008/0168338 A1 Jul. 10, 2008

(30) Foreign Application Priority Data
Jan. 9, 2007 (KR) .................. 10-2007-0002312

(51) Int. Cl.
*G06F 11/10* (2006.01)
*G06F 11/28* (2006.01)
(52) U.S. Cl. ........................ 714/801; 714/48
(58) Field of Classification Search .................. None
See application file for complete search history.

(56) References Cited

U.S. PATENT DOCUMENTS
7,405,604 B2 * 7/2008 Lin et al. .............. 327/161
2003/0182613 A1 9/2003 Chu

FOREIGN PATENT DOCUMENTS
| JP | 19910099522 | 4/1991 |
| KR | 10-1993-0011452 | 6/1993 |
| KR | 1020030052020 | 6/2003 |

* cited by examiner

*Primary Examiner* — Cynthia Britt
*Assistant Examiner* — Dipakkumar Gandhi
(74) *Attorney, Agent, or Firm* — F. Chau & Associates, LLC

(57) ABSTRACT

A parity error detecting circuit includes a first operation unit, a second operation unit, and a shift register. The first operation unit receives a serial data signal and a first signal, performs a logic operation on the two received signals, and outputs the result of the logic operation as the first signal in response to a first clock signal. The shift register shifts the first signal in response to the first clock signal and outputs a second signal. The second operation unit receives the first signal and the second signal, performs a logic operation on the two received signals, and outputs the result of the logic operation in response to a second clock signal.

18 Claims, 8 Drawing Sheets

PARITY ERROR DETECTING CIRCUIT AND METHOD

CROSS-REFERENCE TO RELATED PATENT APPLICATION

This application claims priority under 35 U.S.C. §119 from Korean Patent Application No. 10-2007-0002312, filed on Jan. 9, 2007, the disclosure of which is incorporated by reference herein.

BACKGROUND OF THE INVENTION

1. Technical Field

The present disclosure relates to a parity error detecting circuit, and more particularly, to a parity error detecting circuit which reduces a latency generated during parity error detection and a method of detecting parity error.

2. Discussion of the Related Art

A data signal transmitted from a transmission terminal may be distorted by noise before being received by a reception terminal. The data signal may be transmitted using a parity bit to ensure that the data signal has been properly transmitted. A parity error detecting circuit may then be used to evaluate the data signal to determine whether the signal has been received without distortion.

FIG. 1 is a block diagram of a conventional parallel parity error detecting circuit 100. FIG. 2 is a timing diagram of the conventional parallel parity error detecting circuit 100 shown in FIG. 1. Referring to FIGS. 1 and 2, the conventional parallel parity error detecting circuit 100 includes a data transformation unit 110, a logic operation unit 120, and a flipflop 130.

The data transformation unit 110 samples a received serial data signal SDATA in response to a first clock signal DCLK, and transforms the sampled serial data signal into parallel data signals Pre_Data<N:0>, where N is a natural number.

The data transformation unit 110 outputs the parallel data signals Pre_Data<N:0> simultaneously in response to a second clock signal CLK.

The logic operation unit 120 includes a plurality of exclusive OR (XOR) gates connected to one another in parallel, and performs XOR operations on the received parallel data signals Pre_Data<N:0> in stages, and outputs the result of the XOR operations. The flipflop 130 receives the result of the XOR operations output by the logic operation unit 120 and outputs the same in response to the second clock signal CLK.

As illustrated in the timing diagram of FIG. 2, the conventional parity error detecting circuit 100 requires the second clock signal CLK to transform the serial data signal into the parallel data signals and to perform logic operations on the parities of the parallel data signals to output the results of the logic operations.

As illustrated in FIG. 1, the number of logic circuits (e.g., XOR circuits) of the logic operation unit 120, that are required for calculating the parities of the parallel data signals, increases according to the number of bits of the received serial data signal. The logic circuits accordingly introduce a propagation delay. Thus, there is a need for a parity error detecting circuit and/or method which reduces a latency generated during parity error detection of the received serial data signal.

FIG. 3 is a circuit diagram of a conventional serial parity error detecting circuit 200. FIG. 4 is a timing diagram of the conventional serial parity error detecting circuit 200 shown in FIG. 3. Referring to FIGS. 3 and 4, the general serial parity error detecting circuit 200 includes an XOR gate 210, a first flipflop 220, and a second flipflop 230.

The XOR gate 210 receives a serial data signal SDATA and a feedback signal $Q_n$, performs an XOR operation on the serial data signal SDATA and the feedback signal $Q_n$, and outputs the result of the XOR operation. The first flipflop 220 outputs the output signal of the XOR gate 210 in response to a first clock signal DCLK. The output signal may be output in response to a rising edge of the first clock signal DCLK. The second flipflop 230 receives the output signal $Q_n$ of the first flipflop 220 and outputs the same as a parity error detection signal in response to a second clock signal CLK.

The first clock signal DCLK may be obtained by dividing the second clock signal CLK by N, where N denotes a natural number. The first clock signal DCLK has a period of 1 unit interval (UI). The period of the second clock signal CLK is the same as that of the serial data signal, e.g., a data stream. Each data stream may be composed of N bits, for example, 8 bits. One UI may be one bit of the data stream.

When the serial parity error detecting circuit 200 receives a serial data signal corresponding to one period, checks the parity of the received serial data signal, and outputs the result, the information stored in the first flipflop 220 needs to be initialized to check the parity of a next received serial data signal corresponding to one period. Referring to the timing diagram of FIG. 4, a reset signal RESET of the first flipflop 220 must be enabled during half of one period (i.e., 0.5 UI) of the first clock signal DCLK.

However, when a unit bit of serial data is transmitted at a very high speed, for example, at 2 ns, it may be very difficult to perform a reset operation within 0.5 UI (idea 1 ns). Moreover, an additional device for generating the reset signal RESET is needed. Thus, there is a need for a parity error detecting circuit that does not require reset signals RESET.

SUMMARY OF THE INVENTION

According to an exemplary embodiment of the present invention, there is provided a parity error detecting circuit including a first operation unit, a shift register, and a second operation unit. The first operation unit receives a serial data signal and a first signal, performs a logic operation on the two received signals, and outputs the result of the logic operation as the first signal in response to a first clock signal. The shift register shifts the first signal in response to the first clock signal and outputs a second signal. The second operation unit receives the first signal and the second signal, performs a logic operation on the two received signals, and outputs the result of the logic operation in response to a second clock signal.

The first operation unit may include a first exclusive OR (XOR) gate to perform an XOR operation on the serial data signal and the first signal, and a first flipflop to output an output signal of the first XOR gate as the first signal in response to the first clock signal. The second operation unit may include a second XOR gate to perform an XOR operation on the first signal and the second signal and a second flipflop to output the result of the XOR operation performed by the second XOR gate in response to the second clock signal.

According to an exemplary embodiment of the present invention, there is provided a parity error detecting circuit including a first operation unit, a second operation unit, and a third operation unit. The first operation unit receives a serial data signal and a first signal performs a logic operation on the two received signals, and outputs the result of the logic operation as the first signal in response to a first clock signal. The second operation unit outputs the first signal as a second signal in response to a second clock signal. The third operation unit receives the first signal and the second signal, performs a logic operation on the first and second signals, and outputs the result of the logic operation in response to a third clock signal.

The parity error detecting circuit may further include a clock generator for generating the second clock signal based on the first clock signal and the third clock signal.

The first operation unit may include a first XOR gate to perform an XOR operation on the serial data signal and the first signal, and a first flipflop to output an output signal of the first XOR gate as the first signal in response to the first clock signal. The second operation unit may be a flipflop. The third operation unit may include a second XOR gate to perform an XOR operation on the first signal and the second signal, and a second flipflop to output the result of the XOR operation performed by the second XOR gate in response to the third clock signal.

According to an exemplary embodiment of the present invention, a method for detecting parity error is provided. The method includes receiving a serial data signal and a first signal, performing a first logic operation on the serial data signal and the first signal in response to a first clock signal to generate a second signal, shifting the second signal in response to the first clock signal to generate a third signal, and performing a second logic operation on the second signal and the third signal in response to a second clock signal to generate an output signal. The first and second logic operations may be XOR operations.

BRIEF DESCRIPTION OF THE DRAWINGS

The above and other features of the present invention will become more apparent by describing in detail exemplary embodiments thereof with reference to the attached drawings in which.

DETAILED DESCRIPTION OF EXEMPLARY EMBODIMENTS

Figure 1:
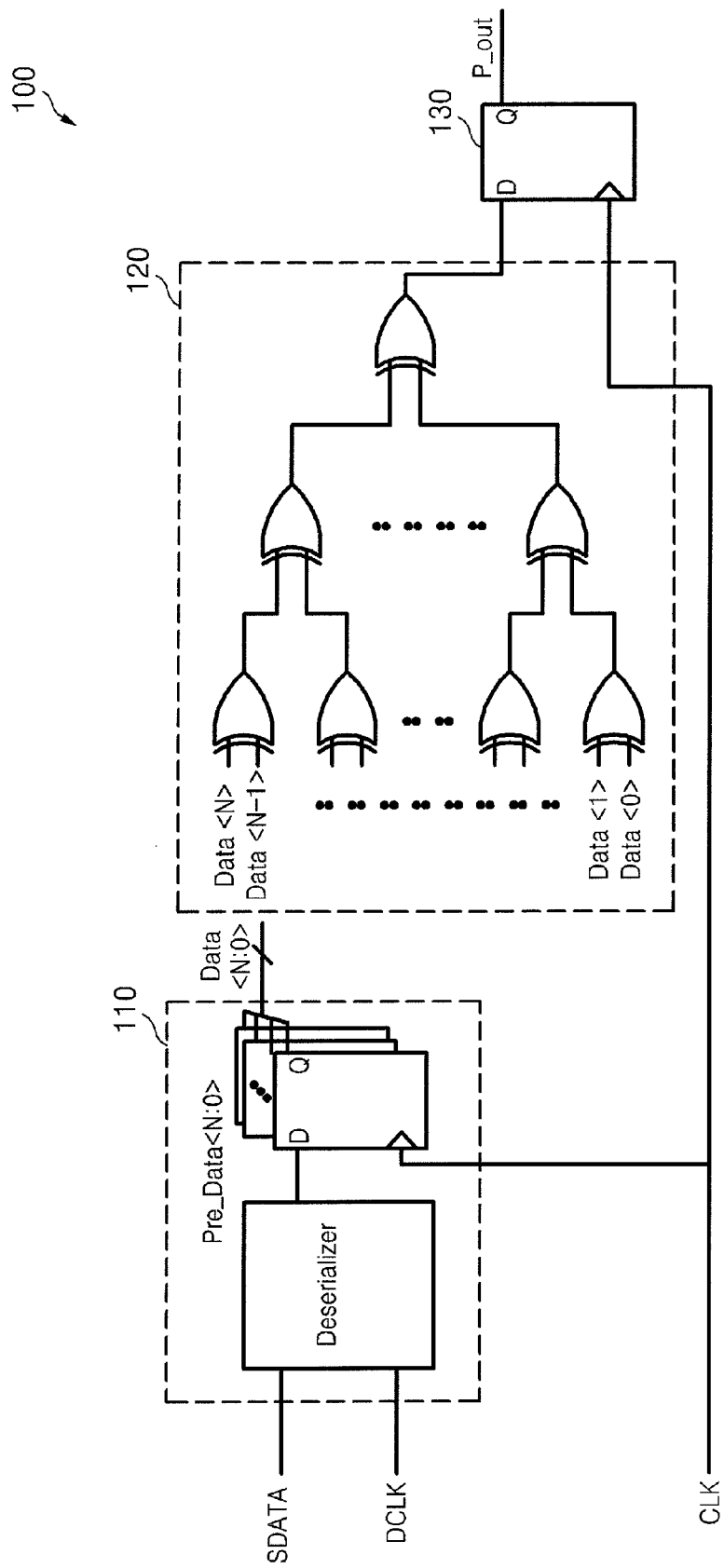
FIG. 1 is a circuit diagram of a conventional parallel parity error detecting circuit.
Figure 2:
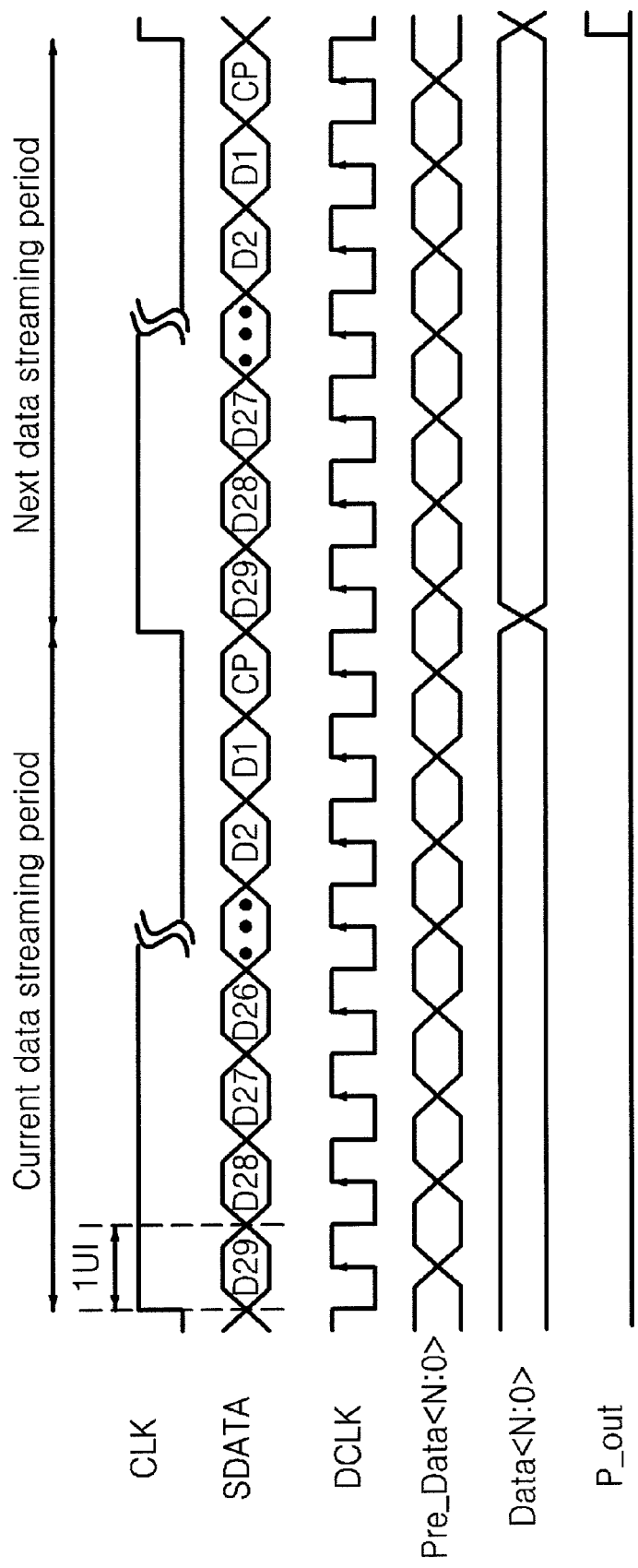
FIG. 2 is a timing diagram of the conventional parallel parity error detecting circuit shown in FIG. 1.
Figure 3:
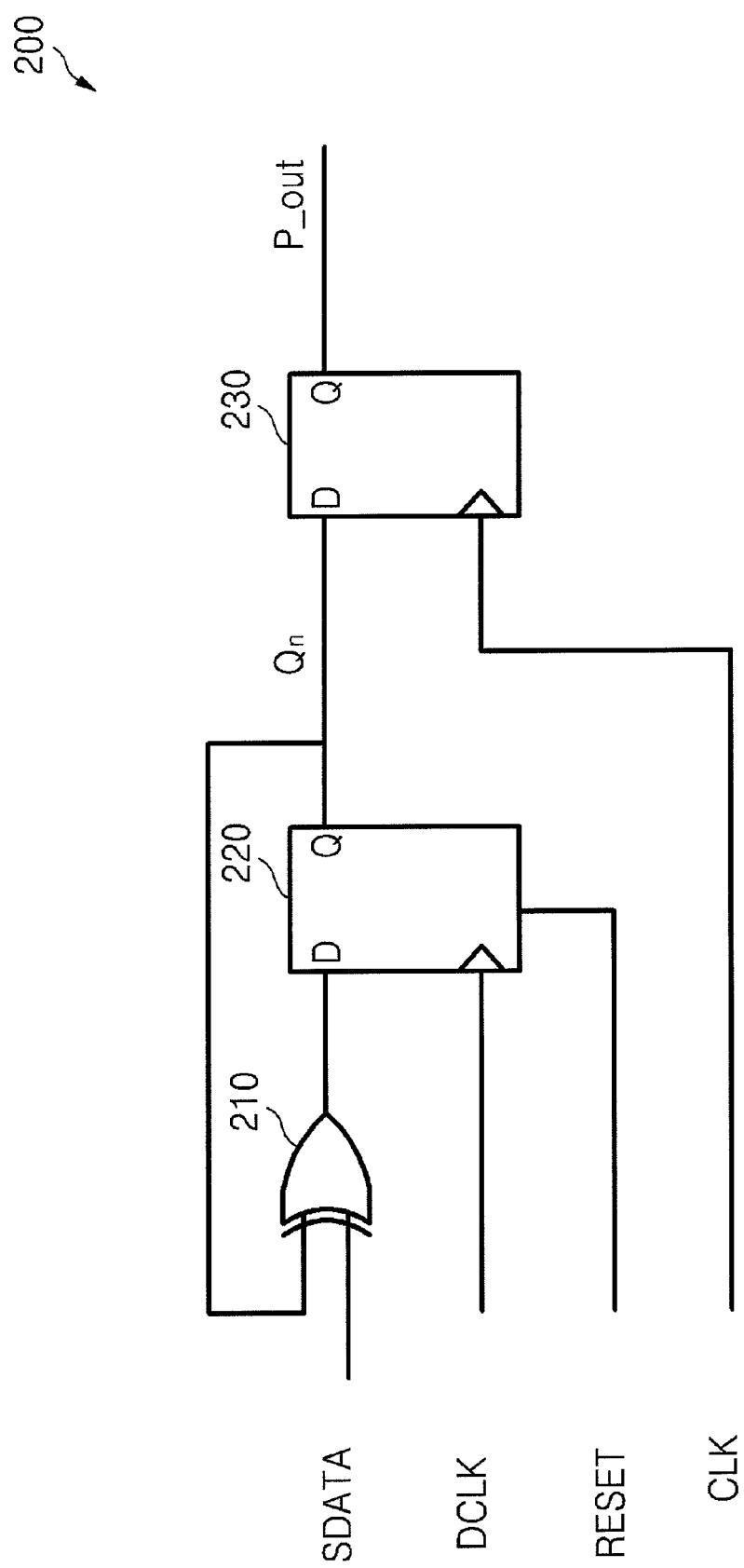
FIG. 3 is a circuit diagram of a conventional serial parity error detecting circuit.
Figure 4:
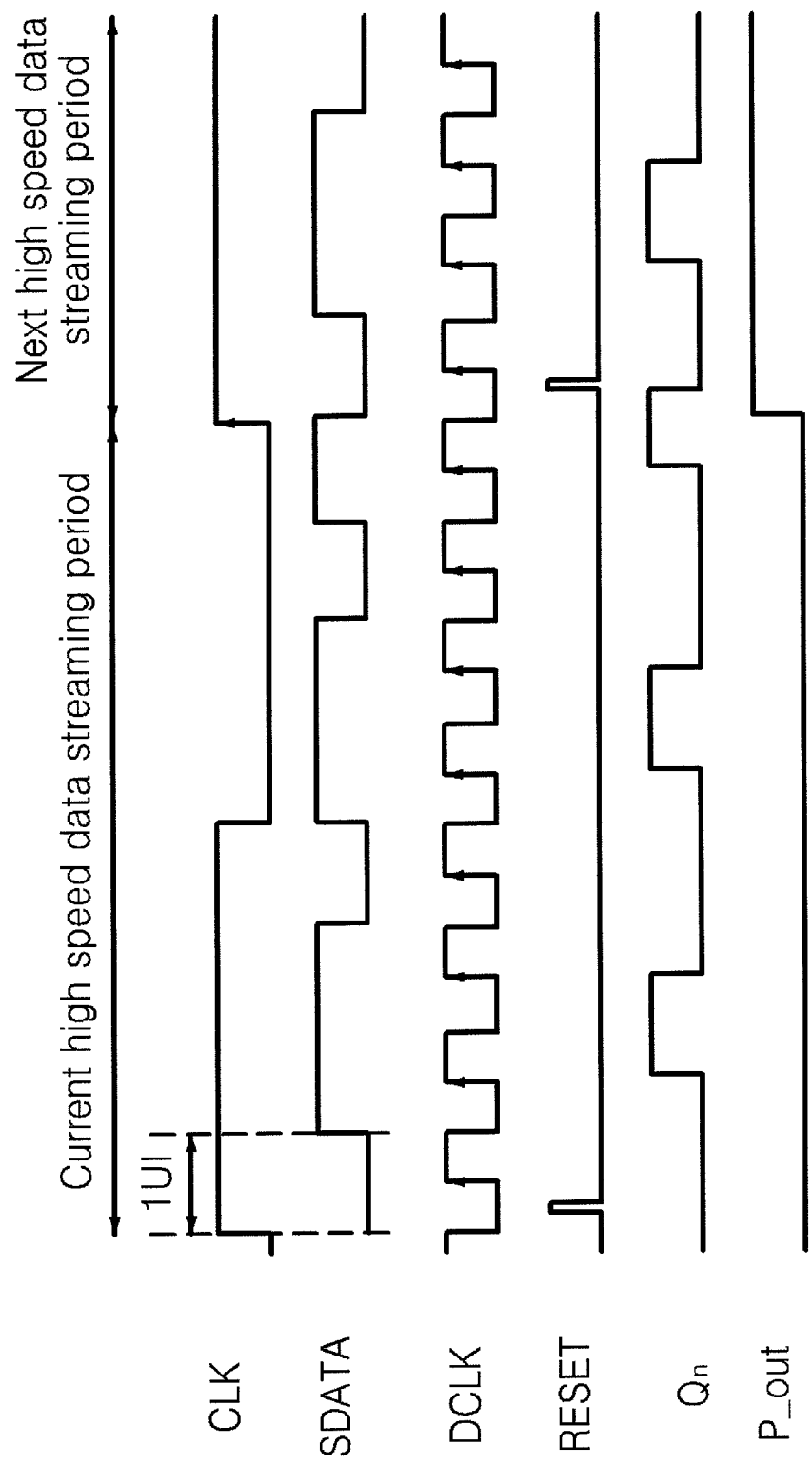
FIG. 4 is a timing diagram of the conventional serial parity error detecting circuit shown in FIG. 3.

Hereinafter, the present invention will be described in detail by explaining exemplary embodiments of the invention with reference to the attached drawings. Like reference numerals in the drawings denote like elements.

Figure 5:
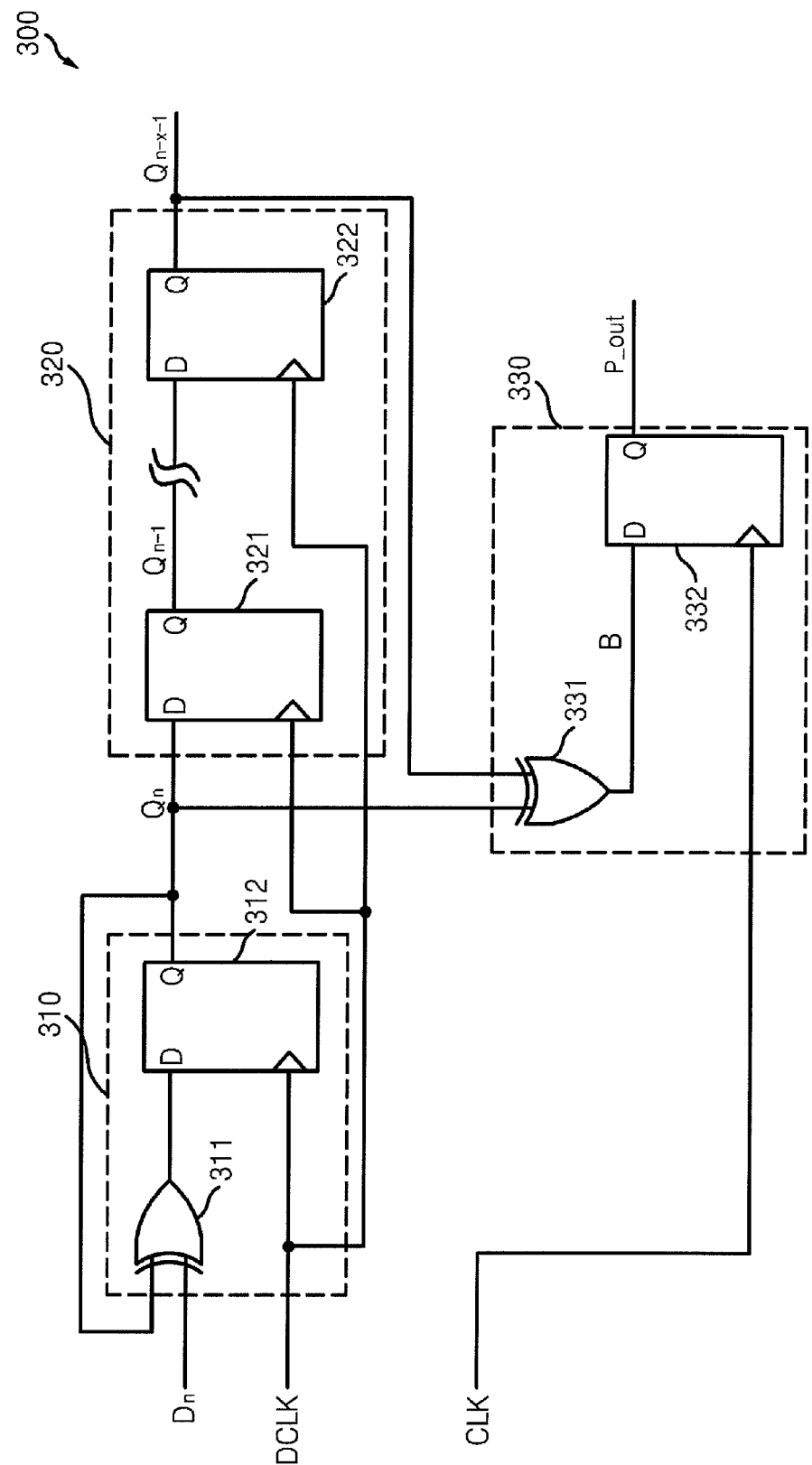
FIG. 5 is a circuit diagram of a parity error detecting circuit according to an exemplary embodiment of the present invention.
Figure 6:
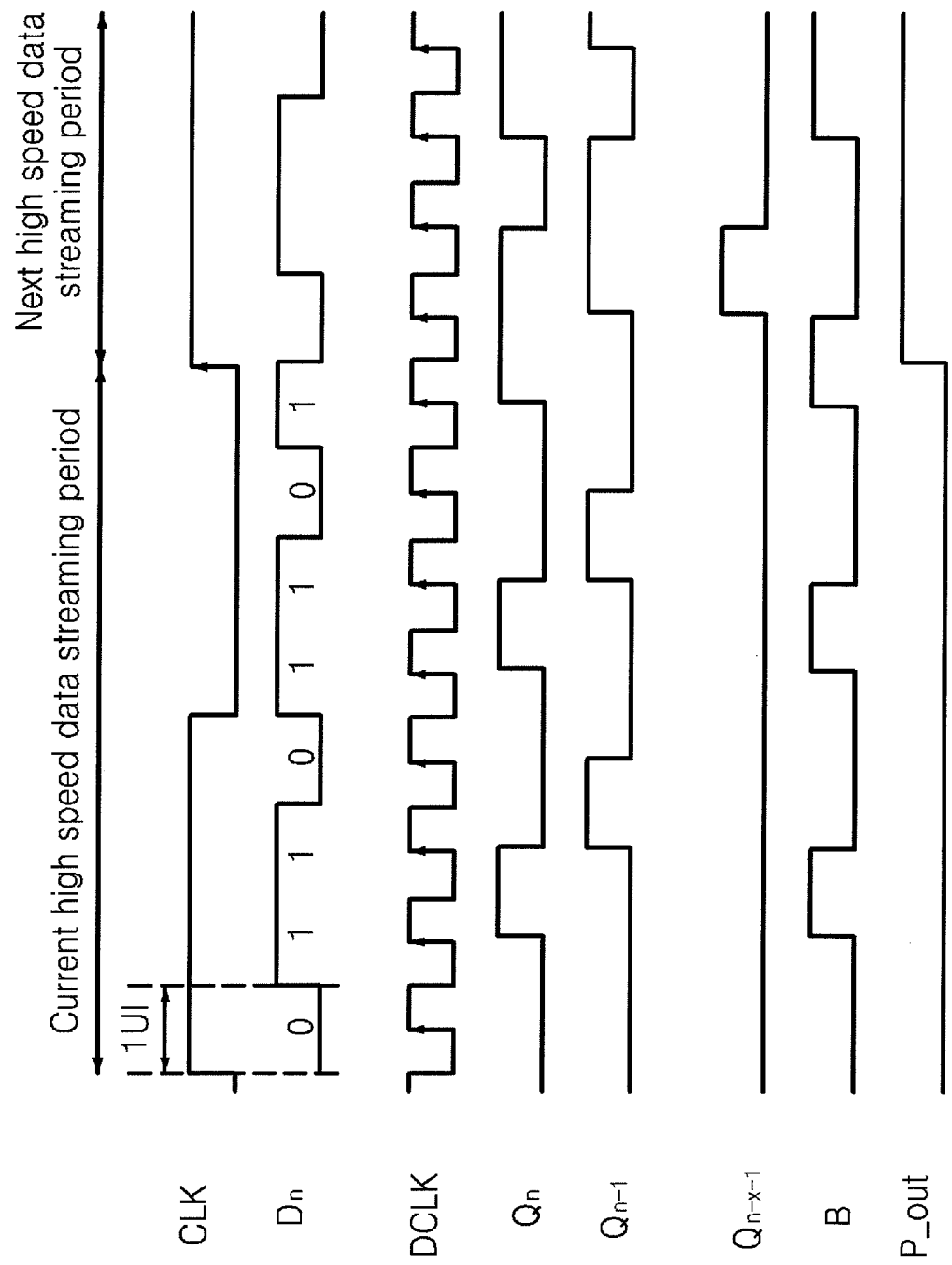
FIG. 6 is a timing diagram of the parity error detecting circuit shown in FIG. 5.

FIG. 5 is a circuit diagram of a parity error detecting circuit 300 according to an exemplary embodiment of the present invention. FIG. 6 is a timing diagram of the parity error detecting circuit 300 shown in FIG. 5. Referring to FIGS. 5 and 6, the parity error detecting circuit 300 includes a first operation unit 310, a shift register 320, and a second operation unit 330.

The first operation unit 310 includes a first exclusive OR (XOR) gate 311 and a first flipflop 312. The first XOR gate 311 receives a serial data signal $D_n$ from an external source and a fed-back first signal $Q_n$, performs an XOR operation on the data signal $D_n$ and the first signal $Q_n$, and outputs the result of the XOR operation.

The serial data signal $D_n$ includes a one-bit parity check bit, for examples '0' or '1', for detecting an error of the serial data signal. The first flipflop 312 outputs, as the first signal $Q_n$, the result of the XOR operation performed by the first XOR gate 311, in response to a rising edge of the first clock signal DCLK.

Accordingly, the first flipflop 312 outputs the result of the XOR operation in response to the first clock signal DCLK. The result of the XOR operation is calculated based on the following Equation 1:

$$Q_n = D_n \oplus Q_{n-1} \quad (1)$$

The shift register 320 includes a plurality of flipflops 321, ..., and 322 serially connected to one another. The shift register 320 receives the first signal $Q_n$ from the first operation unit 310 and sequentially shifts the first signal $Q_n$ in response to rising edges of the first clock signal DCLK to generate a second signal $Q_{n-x-1}$.

When the first operation unit 310 receives the last bit of the serial data signal $D_n$, the first flipflop 312 outputs the last XOR operation result $Q_n$ and the shift register 320 outputs the first XOR operation result $Q_{n-x-1}$, in response to a rising edge of the first clock signal DCLK.

The first clock signal DCLK is obtained by dividing the second clock signal CLK by N, where N denotes a natural number. The first clock signal DCLK has a period of 1 unit interval (UI). The period of the second clock signal CLK is the same as that of the serial data signal $D_n$ (e.g., a data stream). Each data stream may be composed of N bits, for example, 8 bits.

The second operation unit 330 includes a second XOR gate 331 and a second flipflop 332. The second XOR gate 331 receives the output signal $Q_n$ of the first operation unit 310 and the output signal $Q_{n-x-1}$ of the shift register 320, performs an XOR operation on the two signals, and outputs the operation result B.

The second flipflop 332 receives the result B of the XOR operation performed by the second XOR gate 331 and outputs the received XOR operation result B in response to a rising edge of the second clock signal CLK.

As illustrated in Equation 2, the output signal P_out of the second flipflop 332 is the same as a result of an XOR operation performed on the bits of the serial data signal $D_n$ received by the parity error detecting circuit 300:

$$Q_n = D_n \oplus Q_{n-1}$$

$$Q_{n-1} = D_{n-1} \oplus Q_{n-2}$$

$$Q_{n-2} = D_{n-2} \oplus Q_{n-3}$$

$$Q_{n-3} = D_{n-3} \oplus Q_{n-4}$$

$$\cdot$$

$$Q_{n-x} = D_{n-x} \oplus Q_{n-x-1}$$

$$Q_n = D_n \oplus \{D_{n-1} \oplus D_{n-2} \oplus D_{n-3} \oplus D_{n-4} \ldots \oplus D_{n-x} \oplus D_{n-x-1}\}$$

$$\therefore Q_n \oplus Q_{n-x-1} = D_n \oplus D_{n-1} \oplus D_{n-2} \oplus D_{n-3} \oplus D_{n-4} \ldots \oplus D_{n-x} \quad (2)$$

In the following example, it is assumed that a transmission terminal (not shown) transmits a serial data signal according to an even parity method and a serial data signal received by the parity error detecting circuit 300 included in a reception terminal (not shown) has a value of '01101101'. Even parity means there should be an even number of '1s' in the received serial data signal. Since '01101101' contains an odd number of '1s', i.e., 5, an error has occurred during transmission of the serial data signal and thus the serial data signal has been changed.

This error is indicated by an XOR operation performed on the data bits of the received serial data signal which produces a result of '1'. The result corresponds to an output signal P_out of the parity error detecting circuit 300.

Therefore, the output signal P_out of the parity error detecting circuit 300 is identical to a conventional parity error detecting circuit. Alternatively, if the transmission terminal transmits a serial data signal according to an odd parity method, the parity error detecting circuit 300 outputs a value, for example, 0, opposite to the value obtained when the even parity method is used.

Figure 7:
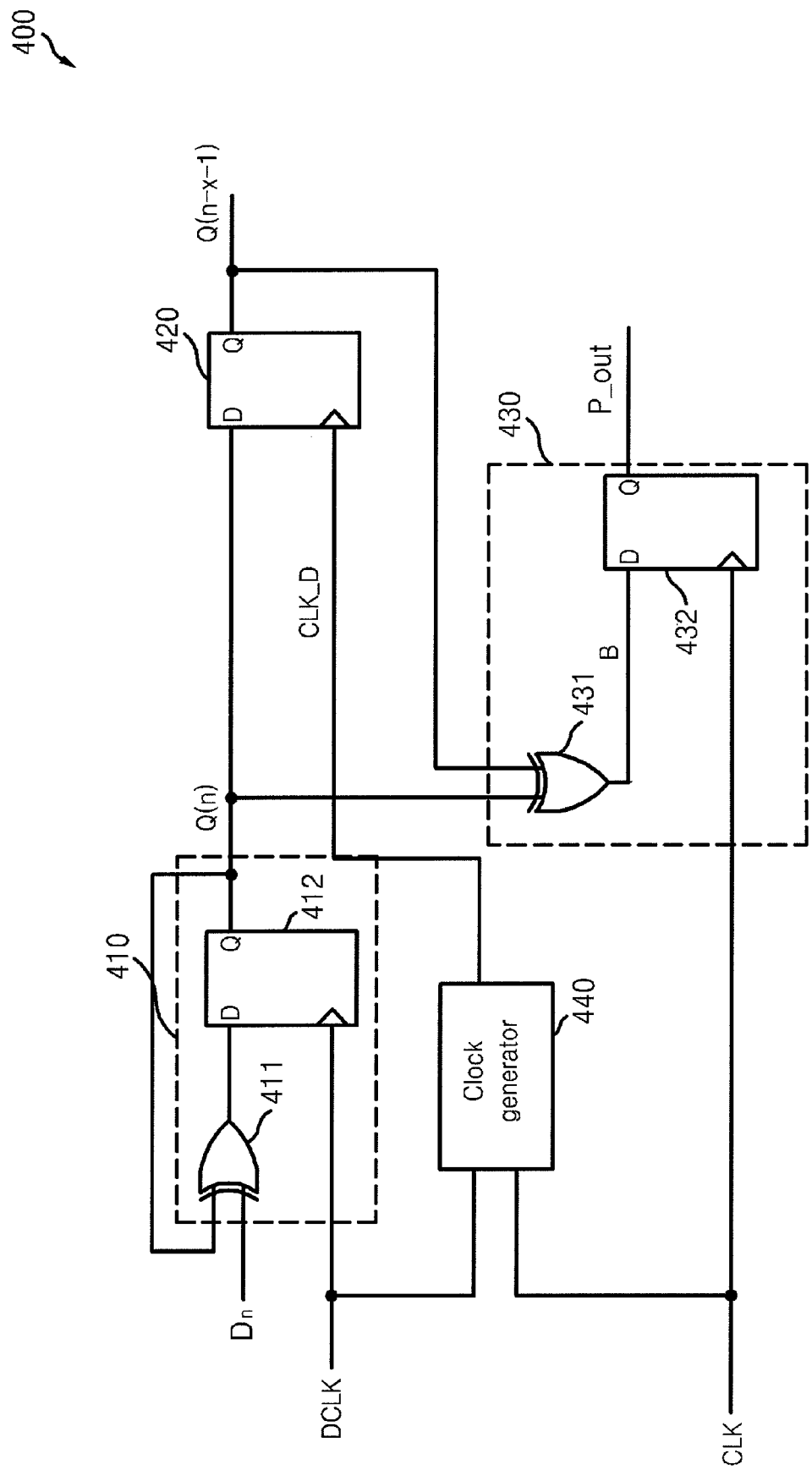
FIG. 7 is a circuit diagram of a parity error detecting circuit according to an exemplary embodiment of the present invention.
Figure 8:
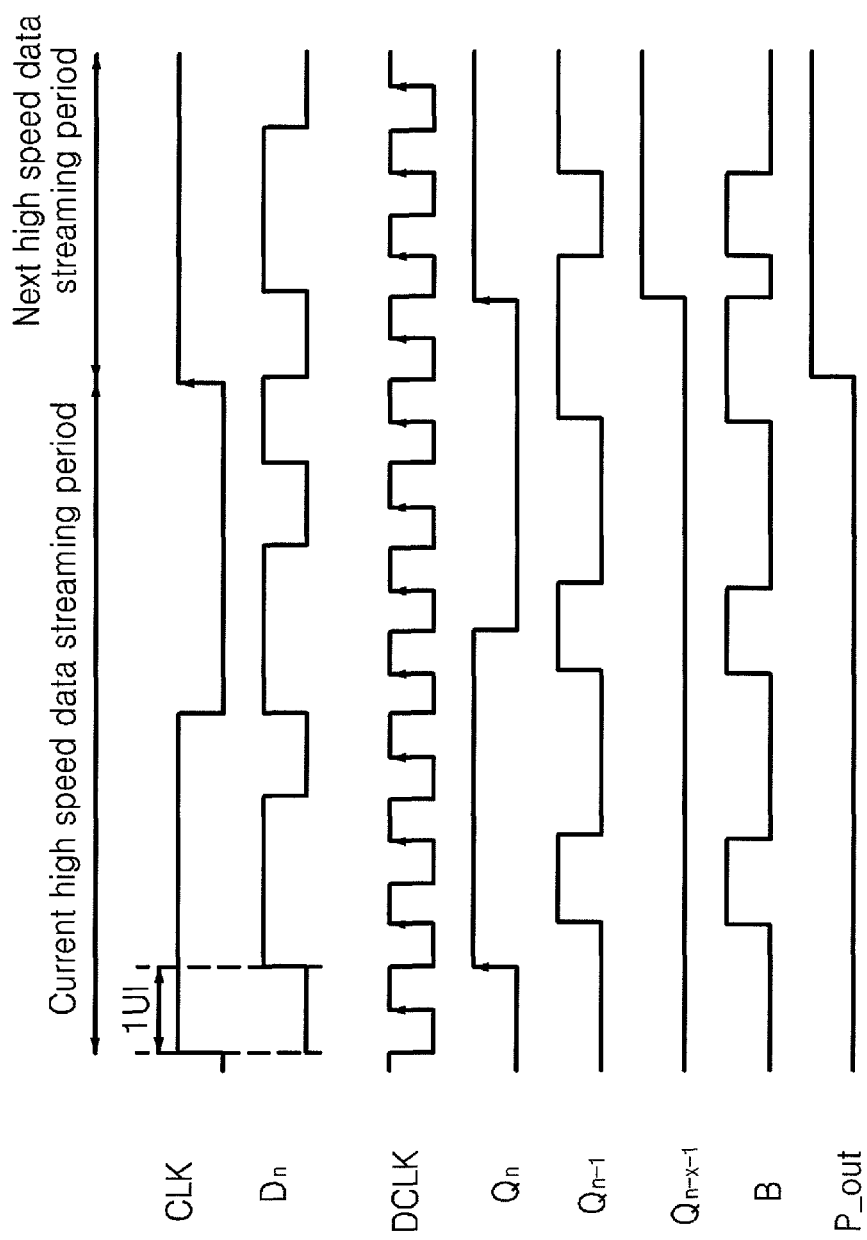
FIG. 8 is a timing diagram of the parity error detecting circuit shown in FIG. 7.

FIG. 7 is a circuit diagram of a parity error detecting circuit 400 according to an exemplary embodiment of the present invention. FIG. 8 is a timing diagram of the parity error detecting circuit 700 shown in FIG. 7. Referring to FIGS. 7 and 8, the parity error detecting circuit 400 includes a first operation unit 410, a second operation unit 420, and a third operation unit 430.

The first operation unit 410 includes a first XOR gate 411 and a first flipflop 412. The first XOR gate 411 receives a serial data signal $D_n$ and a fed-back first signal $Q_n$, performs an XOR operation on the serial data signal $D_n$ and the first signal $Q_n$, and outputs the result of the XOR operation. The serial data signal $D_n$ includes a one-bit parity check bit, for example, '0' or '1', for detecting an error of the serial data signal.

The first flipflop 412 outputs the result of the XOR operation output from the first XOR gate 411, as the first signal $Q_n$ in response to a rising edge of the first clock signal DCLK. As illustrated above with reference to FIG. 5, the first flipflop 412 outputs, as the first signal $Q_n$, the result of the XOR operation calculated based on Equation 1 in response to the first clock signal DCLK.

The second operation unit 420 outputs the result of the XOR operation output from the first operation unit 410, in response to a rising edge of a second clock signal CLK_D. The second operation unit 420 may be implemented as a flipflop. The parity error detecting circuit 400 may further include a clock generator 440 for generating the second clock signal CLK_D.

The second clock signal CLK_D is obtained by delaying a third clock signal CLK by one bit (i.e., 1 UI) of the serial data signal $D_n$. Accordingly, the second operation unit 420 outputs the result $Q_{n-x-1}$ of an XOR operation performed by the first operation unit 410, in response to a rising edge of a second clock signal CLK_D. Accordingly, the value of the output signal of the first flipflop 412 does not change until the next rising edge of the second clock signal CLK_D.

The third operation unit 430 includes a second XOR gate 431 and a second flipflop 432. The second XOR gate 431 receives the XOR operation result $Q_n$ output from the first operation unit 410 and the XOR operation result $Q_{n-x-1}$ output from the second operation unit 420, performs an XOR operation on the two received signals, and outputs an XOR operation result B.

The second flipflop 432 outputs the output signal B of the second XOR gate 431 in response to a rising edge of the third clock signal CLK. As a result, as illustrated in the timing diagram of FIG. 8, the second flipflop 432 outputs the result of a lastly performed logic operation from the output signal B of the second XOR gate 431.

The parity error detecting circuit 400 can detect a parity error of the received data signal $D_n$ by performing an XOR operation on the results $Q_{n-x-1}$ and $Q_n$ of the XOR operations performed first and last by the first XOR gate 411. The parity error detecting circuit 400 does not need a reset signal, and the size of the parity error detecting circuit 400 can be reduced.

A parity error detecting circuit according to at least one embodiment of the present invention can reduce a period of time required for a serial data communications device to detect a parity error, and may have a reduced size as compared to a conventional parity error detecting circuit.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A parity error detecting circuit comprising:
a first operation unit to receive a serial data signal and a feedback signal as a first signal, perform a logic operation on the two received signals, and output a result of the logic operation as the first signal in response to a first clock signal, wherein the first operation unit includes a first flipflop that outputs the result and has a clock terminal receiving the first clock signal;
a shift register to shift the first signal in response to the first clock signal and output a second signal, wherein a clock terminal of the shift register receives the same first clock signal; and
a second operation unit to receive the first signal and the second signal, perform a logic operation on the two received signals, and output a result of the logic operation as a parity error detection signal in response to a second clock signal.

2. The parity error detecting circuit of claim 1, wherein the first operation unit comprises:
a first XOR gate to perform an XOR operation on the serial data signal and the first signal and wherein the first flipflop outputs an output signal of the first XOR gate as the first signal in response to the first clock signal.

3. The parity error detecting circuit of claim 1, wherein second operation unit comprises:
a second XOR gate to perform an XOR operation on the first signal and the second signal; and
a second flipflop to output a result of the XOR operation performed by the second XOR gate in response to the second clock signal.

4. The parity error detecting circuit of claim 1, wherein the period of the first clock signal is substantially the same as the serial data signal.

5. The parity error detecting circuit of claim 4, where the period of the first clock signal corresponds to one bit of the serial data signal.

6. The parity error detecting circuit of claim 1, wherein the first clock signal is generated by dividing the second clock signal by an integer that is at least two.

7. A parity error detecting circuit comprising:
a first operation unit to receive a serial data signal and a feedback signal as a first signal, perform a logic operation on the serial data signal and the first signal, and output a result of the logic operation as the first signal in response to a first clock signal, wherein a period of the first clock signal is substantially the same as the serial data signal;

a second operation unit to output the result as a second signal in response to a second clock signal; and a third operation unit to receive the first signal and the second signal, perform a logic operation on the first and second signals, and output a result of the logic operation as a parity error detection signal in response to a third clock signal, wherein the first clock signal is generated by dividing the third clock signal by an integer that is at least two, and wherein the second clock signal is generated by delaying the third clock signal by the period of the first clock signal.

8. The parity error detecting circuit of claim 7, further comprising a clock generator generating the second clock signal based on the first clock signal and the third clock signal.

9. The parity error detecting circuit of claim 7, wherein the first operation unit comprises:

a first XOR gate to perform an XOR operation on the serial data signal and the first signal; and a first flipflop to output an output signal of the first XOR gate as the first signal in response to the first clock signal.

10. The parity error detecting circuit of claim 7, wherein the second operation unit is a flipflop.

11. The parity error detecting circuit of claim 7, wherein the third operation unit comprises:

a second XOR gate to perform an XOR operation on the first signal and the second signal; and a second flipflop to output a result of the XOR operation performed by the second XOR gate in response to the third clock signal.

12. The parity error detecting circuit of claim 7, wherein a flipflop of the first operation unit receives the first clock signal, a flipflop of the second operation unit receives the second clock signal, and a flipflop of the third operation unit receives the third clock signal.

13. The parity error detecting circuit of claim 7, where the period of the first clock signal corresponds to one bit of the serial data signal.

14. A method of detecting parity error, comprising:

receiving a serial data signal and a feedback signal as a first signal;

performing a first logic operation on the serial data signal and the first signal in response to a first clock signal to generate the first signal, wherein the first signal is output by a first flip-flop whose clock terminal receives the first clock signal;

shifting by a shifter register the first signal in response to the first clock signal to generate a second signal, wherein a clock terminal of the shift register receives the same first clock signal; and performing a second logic operation on the first signal and the second signal in response to a second clock signal to generate an output signal as a parity error detection signal.

15. The method of claim 14, wherein the first and second logic operations are XOR operations.

16. The method of claim 14, wherein the period of the first clock signal is substantially the same as the serial data signal.

17. The method of claim 16, where the period of the first clock signal corresponds to one bit of the serial data signal.

18. The method of claim 14, wherein the first clock signal is generated by dividing the second clock signal by an integer that is at least two.

* * * * *